(12) United States Patent
Karlsson et al.

(10) Patent No.: US 9,680,387 B2
(45) Date of Patent: Jun. 13, 2017

(54) SWITCHED MODE POWER SUPPLY, BASE STATION, AND METHOD OF OPERATING A SWITCHED MODE POWER SUPPLY

(71) Applicant: TELEFONAKTIEBOLAGET L M ERICSSON (PUBL), Stockholm (SE)

(72) Inventors: Magnus Karlsson, Oskarshamn (SE); Oscar Persson, Kalmar (SE); Fredrik Wahledow, Färjestaden (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 9 days.

(21) Appl. No.: 14/768,425

(22) PCT Filed: Nov. 17, 2014

(86) PCT No.: PCT/SE2014/051362
§ 371 (c)(1),
(2) Date: Aug. 17, 2015

(87) PCT Pub. No.: WO2016/080870
PCT Pub. Date: May 26, 2016

(65) Prior Publication Data
US 2016/0344298 A1 Nov. 24, 2016

(51) Int. Cl.
*H02M 3/335* (2006.01)
*H02M 1/00* (2006.01)

(52) U.S. Cl.
CPC ....... *H02M 3/33592* (2013.01); *H02M 3/335* (2013.01); *H02M 3/33523* (2013.01); *H02M 3/33553* (2013.01); *H02M 2001/0022* (2013.01)

(58) Field of Classification Search
CPC ............. H02M 3/335; H02M 3/33507; H02M 3/3353; H02M 3/33546; H02M 3/33569;
(Continued)

(56) References Cited

U.S. PATENT DOCUMENTS 7,352,596 B2* 4/2008 Cheng ................. H02M 3/3372
363/24
7,787,261 B2 8/2010 Farrington et al.
(Continued)

FOREIGN PATENT DOCUMENTS

EP 1119894 A1 8/2001
WO 2013182249 A1 12/2013

*Primary Examiner* — Matthew Nguyen

(57) ABSTRACT

A switched mode power supply comprising a switched mode converter and a controller for controlling the switched mode converter, the switched mode converter being provided for converting an input voltage to an output voltage and including, on a primary side, a primary winding and a controllable switch based circuitry connecting the input voltage over the primary winding; and, on a secondary side, a secondary winding coupled to the primary winding and a capacitive element connected over the secondary winding, wherein the output voltage is obtained as the voltage over the capacitive element. The primary winding comprises a first winding portion and at least one further winding portion and the switch based circuitry comprises controllable switches capable of controlling the duty cycle of the switched mode converter and capable of switching between a first operation state wherein the input voltage is connected only over the first winding portion and at least a second operation state wherein the input voltage is connected over the first and the at least one further winding portions, thereby enabling switching between two different transformer ratios. The controller comprises a first control arrangement connected to monitor the output voltage of the switched mode converter and operatively connected to the controllable switches to control the controllable switches to switch to thereby control the duty cycle in response to the monitored output voltage and a reference voltage using PID feedback control. The controller further comprises a second control arrangement connected to monitor the input voltage of the switched mode
(Continued)

converter and operatively connected to the controllable switches to control the controllable switches to switch between the first and the at least second operation states in response to the monitored input voltage.

21 Claims, 10 Drawing Sheets

(58) Field of Classification Search
CPC .............. H02M 3/337; H02M 3/3376; H02M 2003/10; H02M 2003/156
See application file for complete search history.

(56) References Cited

U.S. PATENT DOCUMENTS

| | | | | |
|---|---|---|---|---|
| 8,625,311 | B2* | 1/2014 | Hosotani | H02M 3/3376 323/284 |
| 8,817,491 | B2* | 8/2014 | Mohr | H02M 3/33569 323/255 |
| 2007/0201250 | A1 | 8/2007 | Nakahori | |
| 2013/0077351 | A1* | 3/2013 | Takegami | H02M 3/335 363/16 |

* cited by examiner

SWITCHED MODE POWER SUPPLY, BASE STATION, AND METHOD OF OPERATING A SWITCHED MODE POWER SUPPLY

RELATED APPLICATIONS

This application is a 371 of PCT/SE2014/051362, filed Nov. 17, 2014, the disclosure of which is fully incorporated herein by reference.

TECHNICAL FIELD

The technical field relates generally to switched mode power supplies (SMPS:es) and methods of operating switched mode power supplies. The switched mode power supplies may be mounted in base stations of a mobile communication network.

BACKGROUND

Using a fixed ratio converter intermediate bus converter (IBC) with constant duty cycle causes the output voltage to vary in a large range depending of the input voltage range. This puts restrictions on the input voltage range in order to avoid overvoltage for downstream point of load converters supplied by the IBC. By controlling and switching the transformer ratio, the output voltage range can be decreased.

In most SMPS topologies, the output voltage is directly proportional to the input voltage $V_o \propto nDV_f$, where D is the duty cycle, and n is the transformer ratio if a transformer is used in the SMPS.

Fixed ratio converters or intermediate bus converters, also referred to as unregulated converters, which lack control of the output voltage, run with a fixed maximized duty cycle. This yields maximized power efficiency since the converter transfer energy almost 100% of the time, with the exception of the dead time needed during switching. With this strategy the output voltage varies with the input voltage according to the above equation. The narrow regulation of the voltage is taken care of by a second layer SMPS referred to as point of load regulators: This power architecture is referred to as intermediate bus architecture, see U.S. Pat. No. 7,787,261 B1.

Semi-regulated converters compensate for the varying input voltage (line regulation) at the expense of a varying duty cycle which reduces the power efficiency. The load affects the output voltage and the output voltage decreases with increasing load, also known as drop. Since the output of a SMPS has an LC filter, load transients cause the output voltage to oscillate, where only the inherent parasitic resistances dampen the oscillations.

Quasi-regulated bus converters, which are described in the above cited U.S. Pat. No. 7,787,261 B1, are line regulated in only one portion of the input voltage range, whereas in other portions of the input voltage range, the converters are unregulated using 100% duty cycle. This yields an increased input voltage range without increasing the output voltage range.

Output regulated converters compensate for varying load conditions and input voltage changes by feedback of the output voltage. Voltage feed forward control is often employed in order to reduce output voltage disturbances due to input voltage transients. This type of regulation offers the most stable output voltage at the cost of lower efficiency.

SUMMARY

The control strategies described in the background have drawbacks in terms of output voltage tolerances, transient responses, and power efficiency. Since many of these properties are dependent upon one another, the optimizing of one causes others to be worse.

It is an aim to provide a switched mode power supply, by which the above drawbacks can be alleviated, or at least mitigated.

A first aspect refers to a switched mode power supply comprising a switched mode converter for converting an input voltage to an output voltage and a controller for controlling the switched mode converter.

The switched mode converter comprises, on a primary side, a primary winding and a controllable switch based circuitry connecting the input voltage over the primary winding, and, on a secondary side, a secondary winding coupled to the primary winding, and a capacitive element connected over the secondary winding, wherein the output voltage is obtained as the voltage over the capacitive element. The primary winding comprises a first winding portion and at least one further winding portion; and the switch based circuitry comprises controllable switches capable of being switched to thereby control the duty cycle of the switched mode converter and capable of being switched between a first operation state wherein the input voltage is connected only over the first winding portion and at least a second operation state wherein the input voltage is connected over the first and the at least one further winding portions, thereby enabling switching between two different transformer ratios.

The controller comprises a first control arrangement connected to monitor the output voltage of the switched mode converter and operatively connected to the controllable switches to control the controllable switches to switch to thereby control the duty cycle in response to the monitored output voltage and a reference voltage using PID feedback control; and a second control arrangement connected to monitor the input voltage of the switched mode converter and operatively connected to the controllable switches to control the controllable switches to switch between the first and the at least second operation states in response to the monitored input voltage.

The first and second control arrangements may typically be configured to control the controllable switches via a driver arrangement comprising one or more drivers.

In one embodiment, the second control arrangement is configured to control the controllable switches to switch from the first operation state to the second operation state when the monitored input voltage increases above a first threshold voltage and to switch from the second operation state back to the first operation state when the monitored input voltage decreases below the first threshold voltage.

In an alternative embodiment, the second control arrangement is configured to control the controllable switches to switch from the first operation state to the second operation state when the monitored input voltage increases above a first threshold voltage and to switch from the second operation state back to the first operation state when the monitored output voltage decreases below a second threshold voltage, wherein the first threshold voltage is higher than the second threshold voltage.

The PID feedback control may comprise controlling the duty cycle in response to a proportional, an integral and a derivative term, each term being provided with a scaling factor, wherein the first control arrangement may be configured to alter the scaling factor of the integral term of the PID feedback control simultaneously as the second control arrangement controls the controllable switches to switch between the first and the at least second operation states.

The first control arrangement may be configured to alter the scaling factor of the integral term of the PID feedback control to a first value when the second control arrangement controls the controllable switches to switch from the first operation state to the second operation state and to a second value when the second control arrangement controls the controllable switches to switch from the second operation state back to the first operation state.

The first and second values may be constants calculated from the transformer ratio of the first and second operation states and the monitored input voltages when the second control arrangement controls the controllable switches to switch between the first and second operation states.

Alternatively, the first control arrangement is configured to repeatedly alter the scaling factor of the integral term of the PID feedback to a value, which is each time calculated from the transformer ratios of the first and second operation states and the current duty cycle.

In a further embodiment, the second control arrangement is connected to monitor the output voltage of the switched mode converter. When the monitored input voltage is below a first threshold voltage, the first control arrangement is configured to control the controllable switches to switch to thereby control the duty cycle in response to the monitored output voltage and a reference voltage using PID feedback control, while the second control arrangement is configured to keep the switched mode converter in the second first state.

When the monitored input voltage is above the first threshold voltage but below a second threshold voltage, which is higher than the first threshold voltage, the second control arrangement is configured to control the controllable switches to switch between the first and the second operation states in response to the monitored output voltage, while the first control arrangement is configured to keep the duty cycle constant.

Finally, when the monitored input voltage is above the second threshold voltage, the first control arrangement is configured to control the controllable switches to switch to thereby control the duty cycle in response to the monitored output voltage and a reference voltage using PID feedback control, while the second control arrangement is configured to keep the switched mode converter in the second operation state.

By controlling the number of active primary winding turns the transformer ratio can be changed on the fly.

The controllable switch based circuitry on the primary side may be any of a full bridge, half bridge, or push-pull based circuitry. The secondary side circuitry may be any of a single winding or double center-tapped winding based circuitry. The converter may be provided with synchronous and non-synchronous rectification circuitry.

In one embodiment, the controllable switches may comprise six switches in three legs with two switches in each of the three legs, wherein each of the legs may be connected in parallel with the input voltage, and a point between the switches of a first one of the legs may be connected to one end of the primary winding, a point between the switches of a second one of the legs may be connected to the opposite end of the primary winding, and a point between the switches of a third one of the legs may be connected to a point the primary winding separating the first winding portion and the at least one further winding portion.

In another embodiment, the primary winding may comprise a first winding portion, a second winding portion, and a third winding portion, wherein the switch based circuitry may comprise controllable switches capable of switching between a first operation state wherein the input voltage is connected only over the first winding portion, a second operation state wherein the input voltage is connected over the first and second winding portions, and a third operation state wherein the input voltage is connected over the first, second, and third winding portions, thereby enabling switching between three different transformer ratios.

The controllable switches may comprise eight switches in four legs with two switches in each of the four legs, wherein each of the legs may be connected in parallel with the input voltage, and a point between the switches of a first one of the legs may be connected to one end of the primary winding, a point between the switches of a second one of the legs may be connected to the opposite end of the primary winding, a point between the switches of a third one of the legs may be connected to a point of the primary winding separating the first and second winding portions, and a point between the switches of a fourth one of the legs may be connected to a point of the primary winding separating the second and third winding portions.

Two switches in at least one of the legs comprise each two MOSFET transistors having their drains or sources connected together.

If the controller is configured to control the controllable switches to switch between a connected state wherein the primary winding is connected to the input voltage and a disconnected state wherein the input voltage is disconnected from the primary winding, to thereby control the duty cycle, the controller may be configured to control the controllable switches to switch such that the current direction through the primary winding is altered every time the primary winding is connected to the input voltage.

The switched mode converter may be a DC-DC converter, e.g. a DC-DC voltage down-converter, e.g. configured to operate with input and output voltages in the range of 10-100 V.

A second aspect refers to a base station comprising the switched mode power supply of the first aspect.

A third aspect refers to a method of operating a switched mode converter of the first aspect. According to the method, the output voltage is monitored, the controllable switches are switched to thereby control the duty cycle of the switched mode converter in response to the monitored output voltage and a reference voltage using PID feedback control, the input voltage is monitored, and the controllable switches are switched between the first and the at least second operation states in response to the monitored output voltage.

The method of the third aspect may comprise switching the switches in accordance with any of the control schemes, methods, and steps as disclosed above with reference to the first aspect.

Further characteristics and advantages will be evident from the detailed description of embodiments given hereinafter, and the accompanying FIGS. 1-16, which are given by way of illustration only.

DETAILED DESCRIPTION

Figure 1:
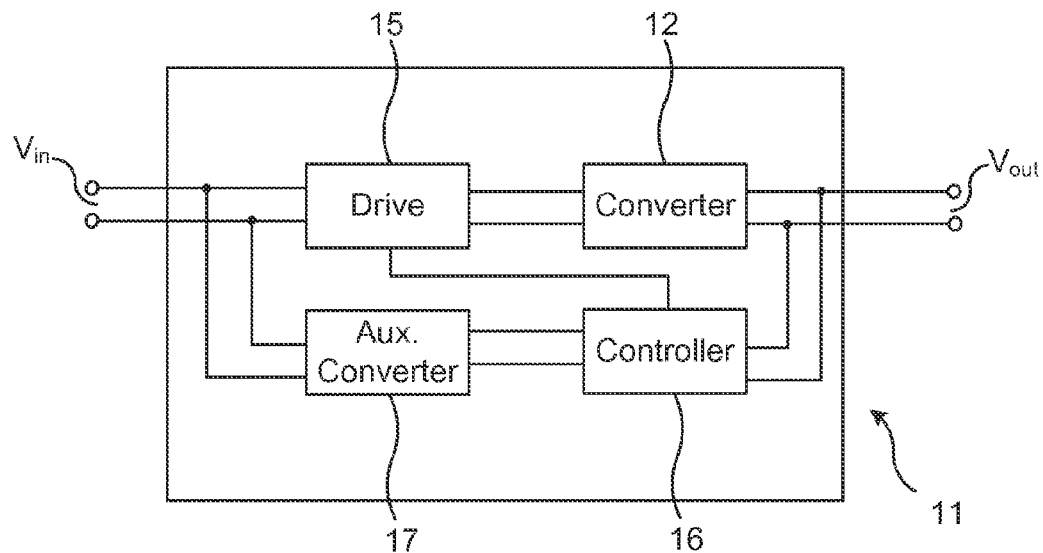
FIG. 1 illustrates, schematically, in a block diagram an embodiment of a switched mode power supply.

FIG. 1 illustrates, schematically, an embodiment of a switched mode power supply comprising a switched mode converter for converting an input voltage Vin to an output voltage Vout, a drive for driving the converter, a controller for controlling the drive and thus the operation of the converter, and a housekeeping or auxiliary converter for down converting the input voltage Vin to a voltage suitable for the controller, such that the controller can be powered by the input voltage Vin.

The converter may be an isolated DC-DC converter, typically down-converting the input voltage Vin to a suitable output power Vout. The converter may typically operate with input Vin and output Vout voltages in the range of 10-100 V.

Figure 2:
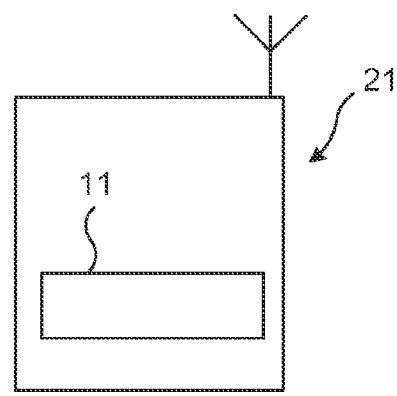
FIG. 2 illustrates, schematically, an embodiment of a base station comprising one or more of the switched mode power supply of FIG. 1.

FIG. 2 illustrates, schematically, an embodiment of a base station comprising one or more of the switched mode power supply of FIG. 1.

Figure 3:
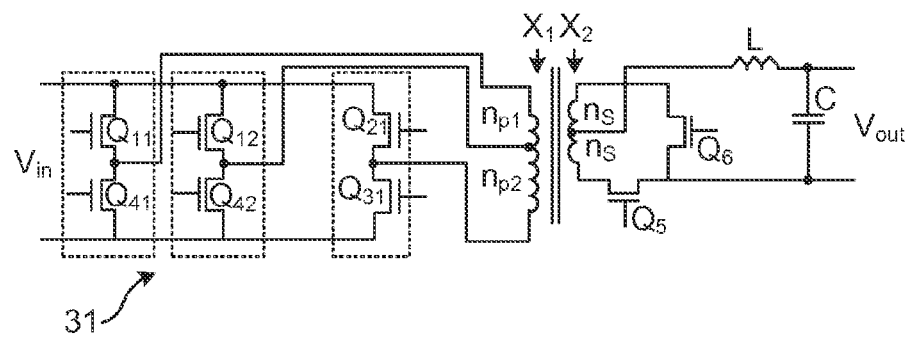
FIG. 3 illustrates, schematically, in a circuit diagram, an embodiment of a converter, which can be used in the switched mode power supply of FIG. 1.

FIG. 3 illustrates, schematically, in a circuit diagram, an embodiment of a converter, which can be used in the switched mode power supply of FIG. 1, wherein a switched primary windings transformer is driven by an extended full-bridge switch circuitry.

The converter comprises, on a primary side, a primary winding X1 and a controllable switch based circuitry connecting the input voltage Vin over the primary winding X1. The primary winding X1 comprises a first winding portion or number of winding turns np1 and a second winding portion or number of winding turns np2. The switch based circuitry comprises controllable switches Q11, Q41, Q12, Q42, Q21, Q31 capable of switching between a first operation state wherein the input voltage Vin is connected only over the first winding portion np1 and a second operation state wherein the input voltage is connected over the first np1 and second $n_{p2}$ winding portions, thereby enabling switching between two different transformer ratios $n_1$, $n_2$ given by:

$$\begin{cases} n_1 = \dfrac{n_s}{n_{p1} + n_{p2}} \text{with } Q11, Q41 \\ n_2 = \dfrac{n_s}{n_{p1}} \text{with } Q12, Q42 \end{cases}$$

where $n_s$ is the number of winding turns on the secondary side.

The switches $Q_{11}, Q_{41}, Q_{12}, Q_{42}, Q_{21}, Q_{31}$ are arranged in three legs with two switches in each of the three legs, wherein each of the legs is connected in parallel with the input voltage $V_{in}$, and a point between the switches $Q_{11}, Q_{41}$ of a first one of the legs is connected to one end of the primary winding $X_1$, a point between the switches $Q_{21}, Q_{31}$ of a second one of the legs is connected to the opposite end of the primary winding $X_1$, and a point between the switches $Q_{12}, Q_{42}$ of a third one of the legs is connected to a point the primary winding $X_1$ separating the first $n_{p1}$ and second $n_{p1}$ winding portions.

The converter comprises, on a secondary side, a secondary winding $X_2$ coupled to the primary winding $X_1$, an inductive element L connected to one end of the secondary winding $X_2$ and a capacitive element C connected over the secondary winding $X_2$, wherein the output voltage is obtained as the voltage over the capacitive element C. The secondary winding $X_2$ may be a double winding having $n_s$ number of winding turns in each winding and switches $Q_5$ and $Q_6$ are provided for secondary side switching in a customary manner.

The controller of the switched mode power supply is operatively connected to monitor the input $V_{in}$ and output $V_{out}$ voltages and is configured to control the controllable switches $Q_{11}, Q_{41}, Q_{12}, Q_{42}, Q_{21}, Q_{31}$ to switch (i) to control the duty cycle of the converter and (ii) to change between the first and the second operation states in response to the monitored output voltage $V_{out}$ to thereby reduce the output voltage variation.

To obtain a suitable duty cycle, the controller may be configured to control the controllable switches $Q_{11}, Q_{41}, Q_{12}, Q_{42}, Q_{21}, Q_{31}$ to switch between a connected state wherein the primary winding $X_1$ is connected to the input voltage $V_{in}$ and a disconnected state wherein the input voltage $V_{in}$ is disconnected from the primary winding $X_1$.

The controller of the switched mode power supply can be implemented using either analog or digital electronics. The controller can be arranged on the primary or the secondary side of the converter, with preference to the primary side.

Figure 4:
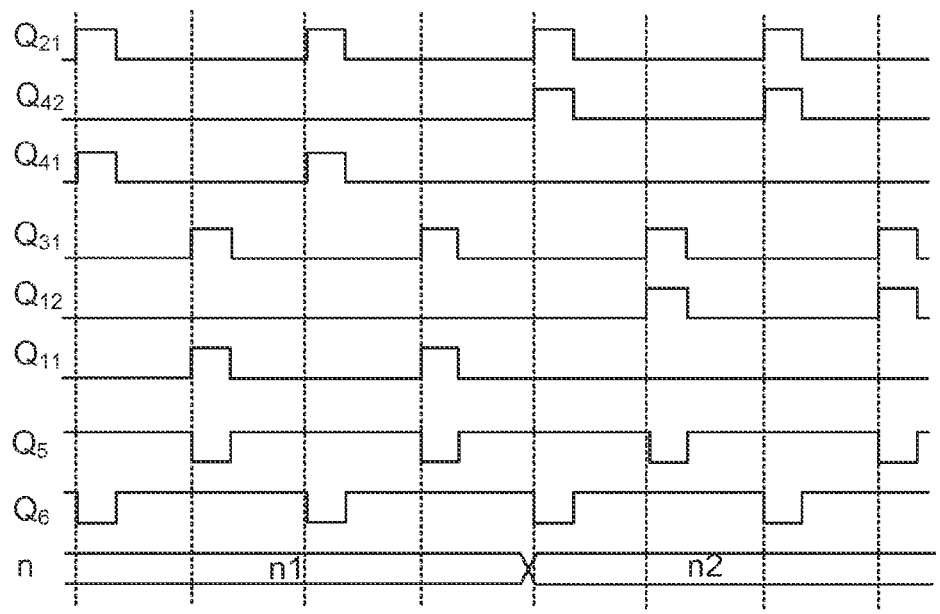
FIG. 4 illustrates, schematically, in a diagram, a switching pattern for the converter of FIG. 3.

FIG. 4 illustrates, schematically, in a timing diagram, a switching pattern for the converter of FIG. 3. The gate signals to the respective switches Q21, Q42, Q41, Q31, Q12, Q11, Q5, and Q6 as well as the active transformer ratio n are illustrated.

Firstly, the leg with switches Q41 and Q11 is active yielding the transformer ratio n1 in the first operation state, and thereafter the leg with switches Q42 and Q12 is active yielding the transformer ratio n2 in the second operation state. It shall be noted that the switches Q41 and Q11 in the first operation state and the switches Q42 and Q12 in the second operation state are synchronized with the switches Q21 and Q31 such that the current direction through the primary winding X1 is alternating in each of the first and second operation states. The switches Q5 and Q6 on the secondary side are switched as indicated in a customary manner.

The switching requires an extra set of drivers for driving the switches Q21, Q42, Q41, Q31, Q12, Q11, and a control arrangement for selecting the transformer ratio n as compared to a fixed transformer ratio operation using full bridge switching.

Figure 5:
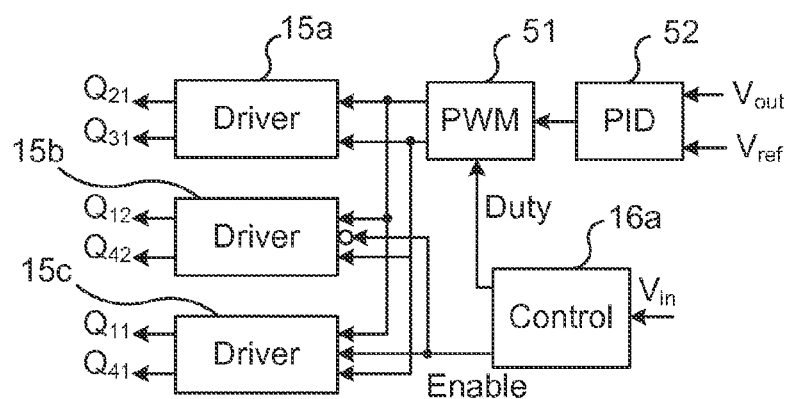
FIG. 5 illustrates, schematically, in a block diagram an embodiment of a driver and controller arrangement for the converter of FIG. 3.
Figures 6A, 6B, 6C, 6D, 6E:
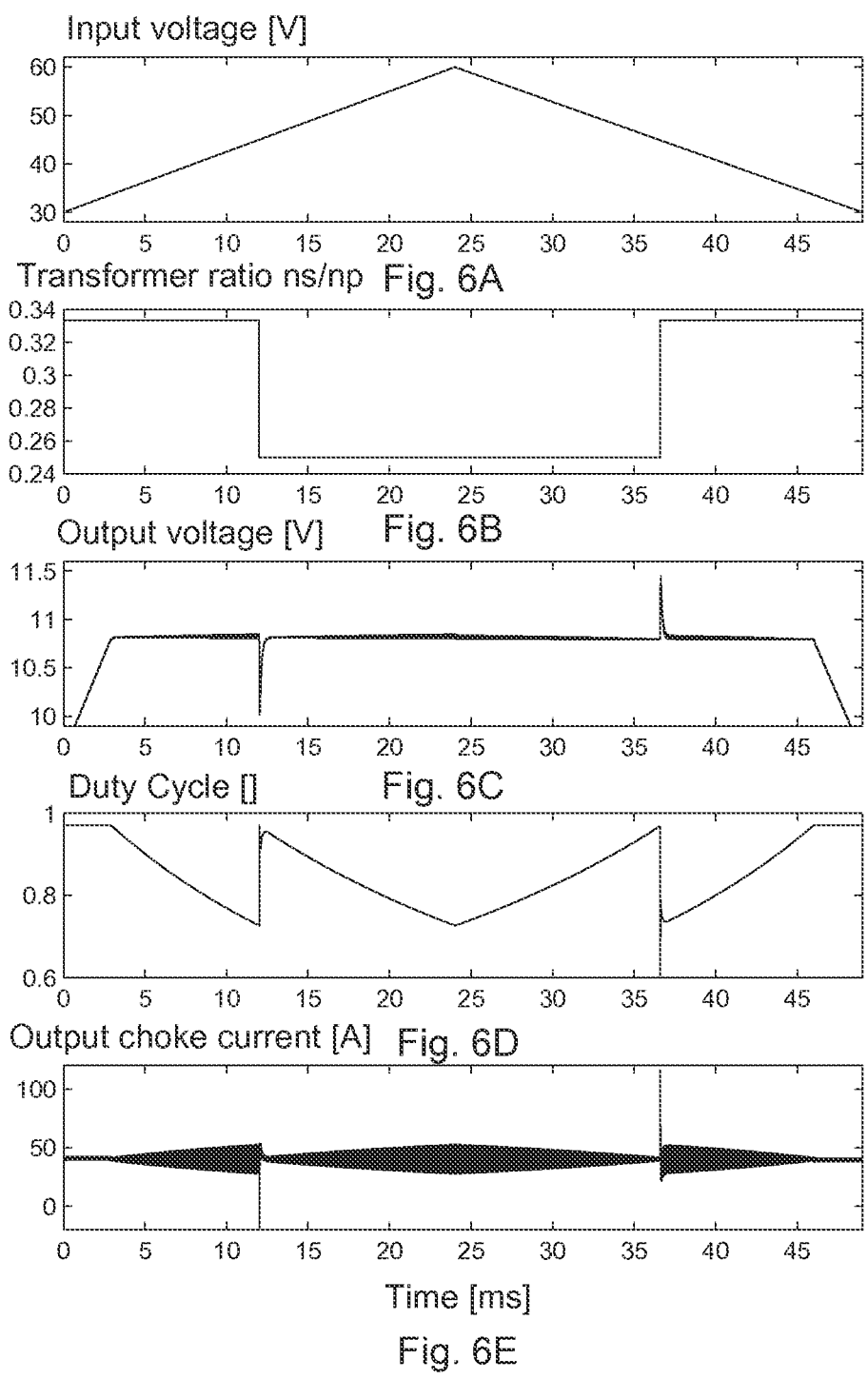
FIGS. 6a-e illustrate, schematically, in respective diagrams, the input voltage, the transformer ratio, the output voltage, the duty cycle, and the choke current of the converter of FIG. 3 during a simulated operation using the driver and controller arrangement of FIG. 5.

FIG. 5 illustrates, schematically, in a block diagram an embodiment of a driver and controller for the converter of FIG. 3 comprising a driver for the respective leg of the converter, a control circuit for selecting transformer ratio n, a pulse width modulator (PWM), and a PID controller. The drivers may be comprised in the drive of the switched mode power supply of FIG. 1 and the control circuit, the pulse width modulator, and the PID controller may be comprised in the controller of the switched mode power supply of FIG. 1. The control circuit is configured to select the transformer ratio n depending on the monitored output voltage Vout and enables the leg Q12, Q42 or the leg Q11, Q41 to be switched. The PID controller is configured to control the duty cycle in response to the monitored output voltage Vout and a reference voltage using PID feedback control.

In a first control scheme for the driver and controller arrangement of FIG. 5, the control circuit is configured to control the controllable switches Q11, Q41, Q12, Q42, Q21, Q31 to switch from the first operation state to the second operation state when the monitored input voltage Vi increases above a first threshold voltage VH and to switch from the second operation state back to the first operation state when the monitored input voltage Vi decreases below the first threshold voltage VH.

In a second control scheme for the driver and controller arrangement of FIG. 5, the control circuit is configured to control the controllable switches Q11, Q41, Q12, Q42, Q21, Q31 to switch from the first operation state to the second operation state when the monitored input voltage Vin increases above a first threshold voltage VH and to switch from the second operation state back to the first operation state when the monitored input voltage Vin decreases below a second threshold voltage VL, which is lower than the first threshold voltage VH to obtain hysteresis control.

FIGS. 6a-e illustrate, schematically, in respective diagrams, the output voltage, the transformer ratio, the output voltage, the duty cycle and the choke current of the converter of FIG. 3 during a simulated operation using the second control scheme.

The simulation was made of a converter with three and four primary winding turns (in the two operation states) and one secondary winding turn, i.e. the transformer ratios 3:1 and 4:1 respectively. The input voltage was swept in the range [30, 60] V, the first threshold voltage VH was set to 46 V and the second threshold voltage VL was set to 45 V. The output voltage is regulated towards a reference voltage of 10.8 V using regulated ratio. The output choke was 400 nH and the total capacitance was 1.5 mF, which in many applications is a small capacitance.

The simulation shows three different working regions:
(i) The input voltage $V_{in}$ is too low to keep the output voltage $V_{out}$ at 10.8 V, and the output voltage $V_{out}$ is increased when the input voltage $V_{in}$ is increased. The lower transformer ratio 3:1 is used. The reference voltage is following the input voltage, i.e., regulated ratio is used.
(ii) The input voltage $V_{in}$ is in the range 35-46 V, and the PID controller is working operating with a constant reference voltage of 10.8V, still using a using the lower transformer ratio of 3:1.
(iii) The input voltage $V_{in}$ is in the range 45-60 $V_{in}$, and the PID is controller is still working with a constant reference voltage of 10.8V, but the transformer ratio is now changed to 4:1.

The simulation shows transients during the switching of the transformer ratio, where the output voltage transients is about, +/−0.7 V. While the current transient reaches 160 A peak above the nominal current ripple in the choke.

The PID feedback control comprises controlling the duty cycle in response to a proportional, an integral and a derivative term, where each term is provided with a scaling factor.

In order to minimize the transients, scaling of the duty cycle can be performed by scaling the integral term of the PID feedback control, which contains during steady state a value corresponding to the duty cycle. Since the number of secondary side winding turns is constant, only the number of primary side winding turns is enough to include in the equation. I.e., at switching the transformer ratio, the following equation is obtained $$D_{new} = \frac{primary_{new}}{primary_{old}} D_{old}$$

where $D_{new}$ is new duty cycle to be used after switching, $D_{old}$ is the duty cycle before switching, $primary_{new}$ is the number of winding turns at the primary side after switching and $primary_{old}$ is the number of winding turns at the primary side before switching.

Thus, only two combinations are possible:

$$D_{low} = \frac{primary_{low}}{primary_{high}} D_{old}$$

$$D_{high} = \frac{primary_{high}}{primary_{low}} D_{old}$$

where $D_{low}$ is the new duty cycle to be used after switching from the higher number of winding turns to the lower number of winding turns on the primary side, $primary_{low}$ is the lower number of winding turns and $primary_{high}$ is the higher number of winding turns. $D_{high}$ is the new duty cycle to be used after switching from the lower number of winding turns to the higher number of winding turns on the primary side.

In order to avoid calculations the constants, $k_{low}$ and $k_{high}$ can be pre-computed and stored in a memory, where the constants are $$k_{low} = \frac{primary_{low}}{primary_{high}}$$

$$k_{high} = \frac{primary_{high}}{primary_{low}}$$

The real time calculation required when the transformer ratio is changed, is one of the following equations depending on whether switching is made from the higher number of winding turns to the lower number of winding turns, or from the lower number of winding turns to the higher number of winding turns.

$$D_{low} = k_{low} D_{old}$$

$$D_{high} = k_{high} D_{old}$$

Figure 7:
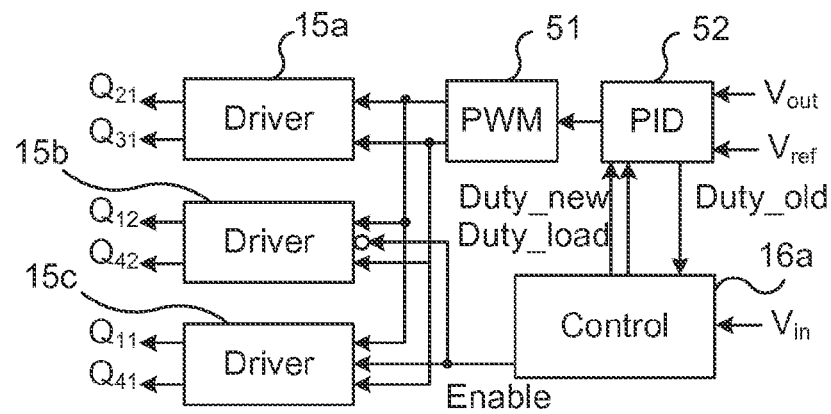
FIG. 7 illustrates, schematically, in a block diagram an alternative embodiment of a driver and controller arrangement for the converter of FIG. 3.

FIG. 7 illustrates, schematically, in a block diagram an embodiment of a driver and controller arrangement for the converter of FIG. 3 in order to implement the above approach. The control circuit 16a reads the old duty cycle Duty_Old from the PID controller, calculates the new duty cycle Duty_New according to one of the equations above and loads it into the PID controller at each switching of operation state. The PID controller uses the loaded duty cycle Duty_New in the integral term of the PID feedback control.

Figure 8A:
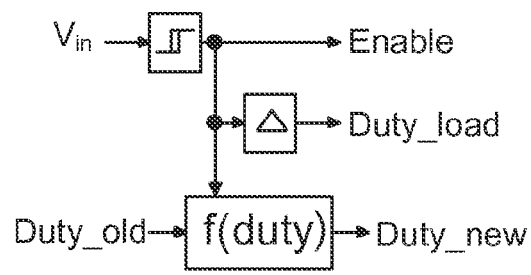
FIGS. 8a-b illustrate, schematically, a control block and a block for preloading duty cycles for use in the controller arrangement of FIG. 7.
Figure 8B:
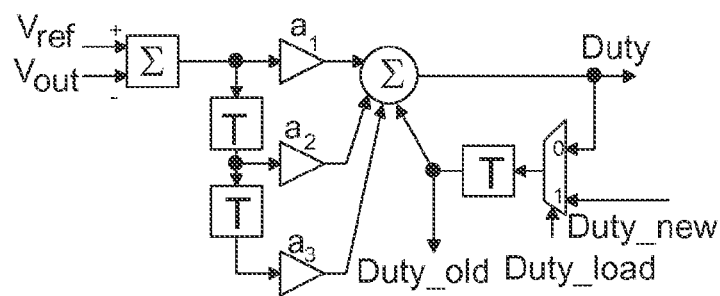
Figures 9A, 9B, 9C, 9D, 9E:
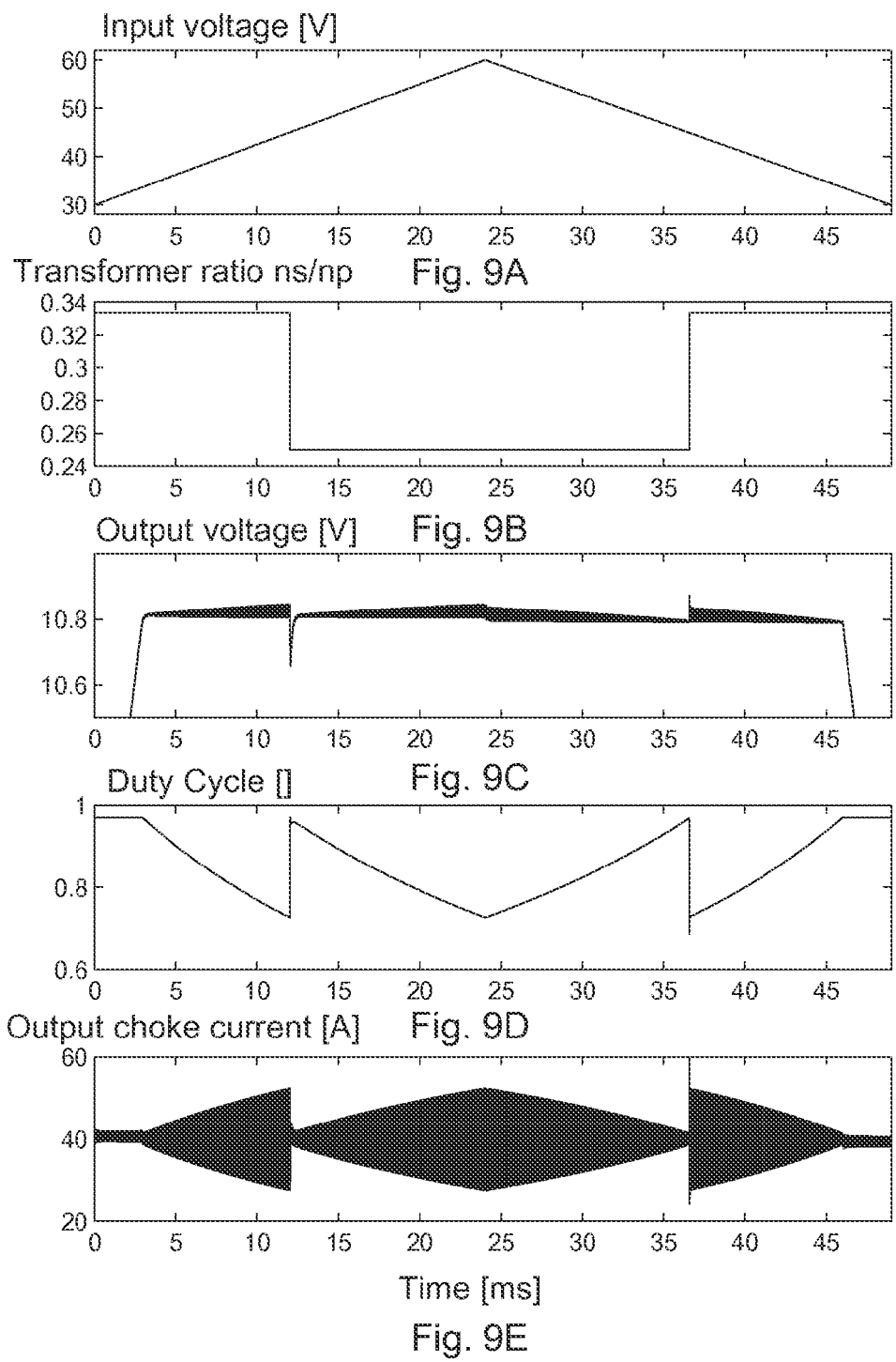
FIGS. 9a-e illustrate, schematically, in respective diagrams, the input voltage, the transformer ratio, the output voltage, the duty cycle, and the choke current of the converter of FIG. 3 during a simulated operation using the driver and controller arrangement of FIG. 7.

FIGS. 8a-b illustrate, schematically, an example of a control block and a block for preloading duty cycles for use in the controller arrangement of FIG. 7.

The hysteresis block $\mathcal{F}$ determines which of the transformer ratios that should be used and generates the corresponding enable signal to the drivers. Any change in the enable signal is detected by a delta block Δ, and a computation block f(duty) implements one of the equations above. Depending on which function that is implemented, the direction of changing transformer ratio may be used inside the computation block. FIG. 8b shows a standard PID implementation, wherein a multiplexer Σ implements the loading of the new duty cycle Duty_New into registers T, which implements one sample delay. The coefficients set the zeros in the transfer function of the PID controller.

A simulation of this strategy with scaling of the duty cycle at the same time as the transformer ratio is switched has been performed. Otherwise, the simulation was made with the same settings as the simulation reported above. The converter has three and four primary winding turns and one secondary winding turn, i.e. the transformer ratios are 3:1 and 4:1 respectively. The input voltage was swept in the range [30, 60] V, the first threshold voltage VH was set to 46 V and the second threshold voltage VL was set to 45 V. The output voltage is regulated towards a reference voltage of 10.8 V using regulated ratio. The output choke was 400 nH and the total capacitance was 1.5 mF, which in many applications is a small capacitance.

FIG. 9a-e illustrate, schematically, in respective diagrams, the input voltage, the transformer ratio, the output voltage, the duty cycle, and the choke current of the simulation. The output voltage transients are reduced from 0.7 V down to 0.15 V and the current transient is reduced from 160 A down to 10 A above the natural current ripple.

Another even simpler alternative is to use two pre-computed $D_{high}$ and $D_{low}$ duty cycle values, using constants calculated from the threshold voltages VH, VL and the transformer ratios, given as primary winding turns plow and phigh.

When the transformer ratio should be switched from 3 to 4 primary side winding turns, the following nominal duty cycle should be loaded $$D_{high} = \frac{V_{out} p_{high}}{VH} = \frac{10.8 \cdot 4}{46} = 0.9391$$

When the transformer ratio should be switched from 4 to 3 primary side winding turns, the following duty cycle should be loaded.

$$D_{low} = \frac{V_{out} p_{low}}{VL} = \frac{10.8 \cdot 3}{45} = 0.72$$

Figure 10:
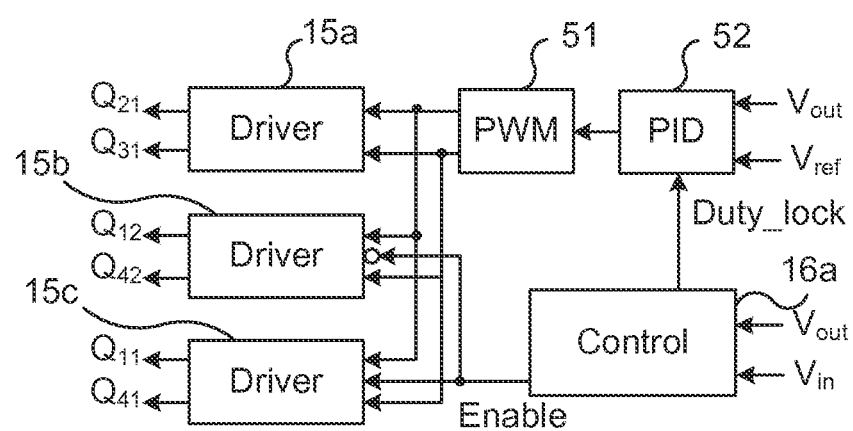
FIG. 10 illustrates, schematically, in a block diagram a further alternative embodiment of a driver and controller arrangement for the converter of FIG. 3.
Figure 11:
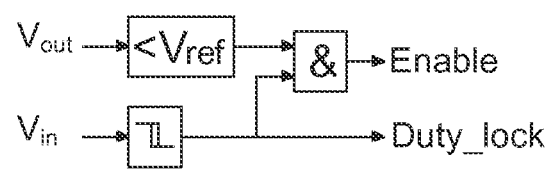
FIG. 11 illustrates, schematically, a control block for use in the controller arrangement of FIG. 10.
Figure 12A:
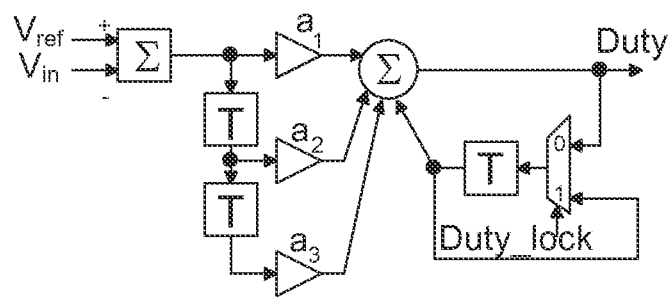
FIGS. 12a-b illustrate, schematically, two alternative blocks for locking the duty cycle for use in the controller arrangement of FIG. 10.
Figure 12B:
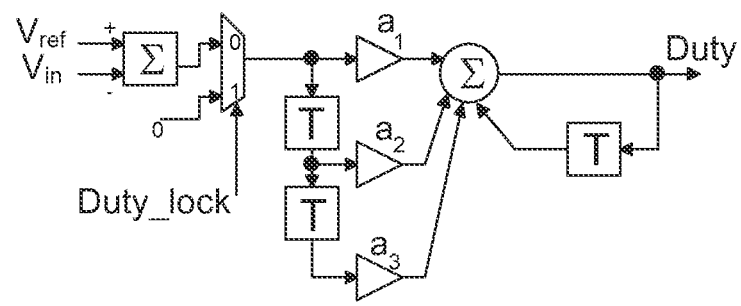
Figure 13A:
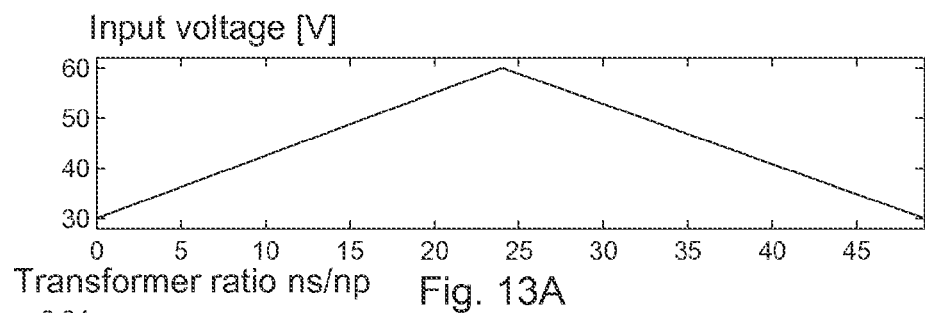
FIG. 13a-e illustrate, schematically, in respective diagrams, the input voltage, the transformer ratio, the output voltage, the duty cycle, and the choke current of the converter of FIG. 3 during a simulated operation using the driver and controller arrangement of FIG. 10.
Figure 13B:
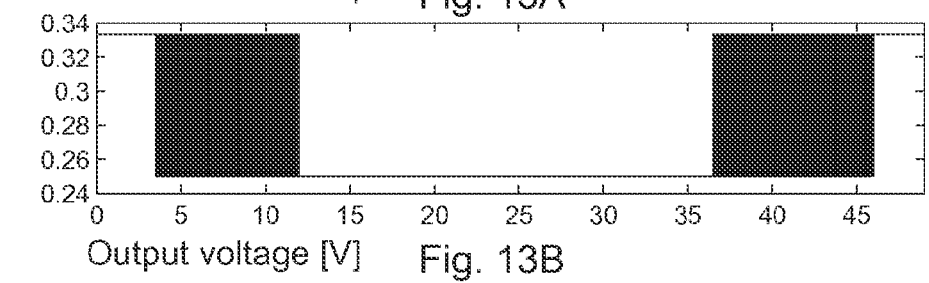
Figure 13C:
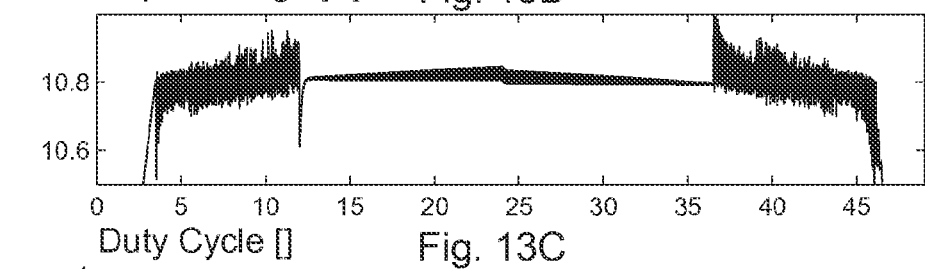
Figure 13D:
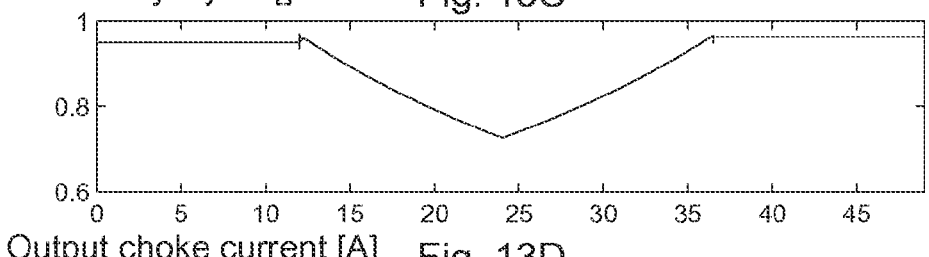
Figure 13E:
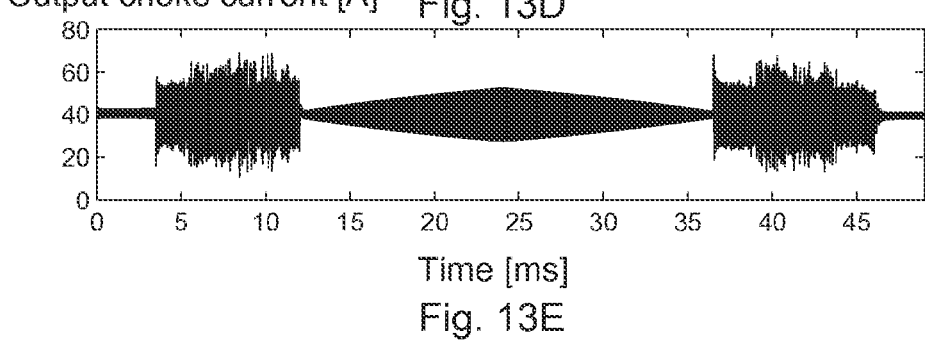

FIG. 10 illustrates, schematically, in a block diagram a further alternative embodiment of a driver and controller arrangement for the converter of FIG. 3, FIG. 11 illustrates, schematically, an example of a control block for use in the controller arrangement of FIG. 10, and FIGS. 12a-b illustrate, schematically, two alternative examples of blocks for locking the duty cycle for use in the controller arrangement of FIG. 10.

FIG. 13a-e illustrate, schematically, in respective diagrams, the input voltage, the transformer ratio, the output voltage, the duty cycle, and the choke current of the converter of FIG. 3 during a simulated operation using the driver and controller arrangement of FIG. 10. The simulation is made with the previous settings except for the following differences.

In this control approach, the PID feedback control is combined with output voltage hysteresis for the switching of transformer ratios.

Three different operating regions can be identified.
(i) The input voltage $V_{in}$ is below a first threshold voltage. In this region, the input voltage $V_{in}$ is too low to keep the output voltage $V_{out}$ of 10.8 V. The lower transformer ratio of 3:1 is used and the reference voltage is following the input voltage $V_{in}$, i.e., regulated ratio is employed. This region may alternatively be detected as $V_{out}$ being less than an output threshold voltage or reference voltage, e.g. 10.8 V.
(ii) The input voltage $V_{in}$ is in the range 35-45 V, and output voltage hysteresis is used, to select the transformer ratio, i.e., the number of primary side winding turns. The duty cycle is locked to a constant value, e.g. a nominal value $D_{nom}$ of 0.95. The locking of the duty cycle is made by the control circuit as shown in FIG. 10.
(iii) The input voltage $V_{in}$ is above 45 V, i.e. in the range 45-60 V, the PID controller is now operating with a constant reference voltage of 10.8 V, and the transformer ratio of 4:1 is used.

Referring to FIG. 11, the hysteresis block $\mathcal{F}$ decides in which operating region the controller 16 should operate, i.e. when the duty cycle should be locked. At input voltages of 35-45 V, the switched ratio output voltage hysteresis or level (a comparison with the voltage reference) is controlling the output voltage at the same time as the PID's integral value is locked. At higher input voltages (above 45 V), the transformer ratio is fixed at the higher number of primary side turns and the duty cycle is released and the PID controller controls the output voltage in a normal manner.

Referring to FIGS. 12a-b, the PID duty cycle can be locked in at least two different ways with similar performance when locking/unlocking the duty cycle. In FIG. 12a, the locking of the duty cycle is obtained by feeding back the output to the input using a multiplexer Σ. In FIG. 12b, the error is zeroed out into the PID controller by means of a multiplexer Σ or a multiplier.

Figure 14:
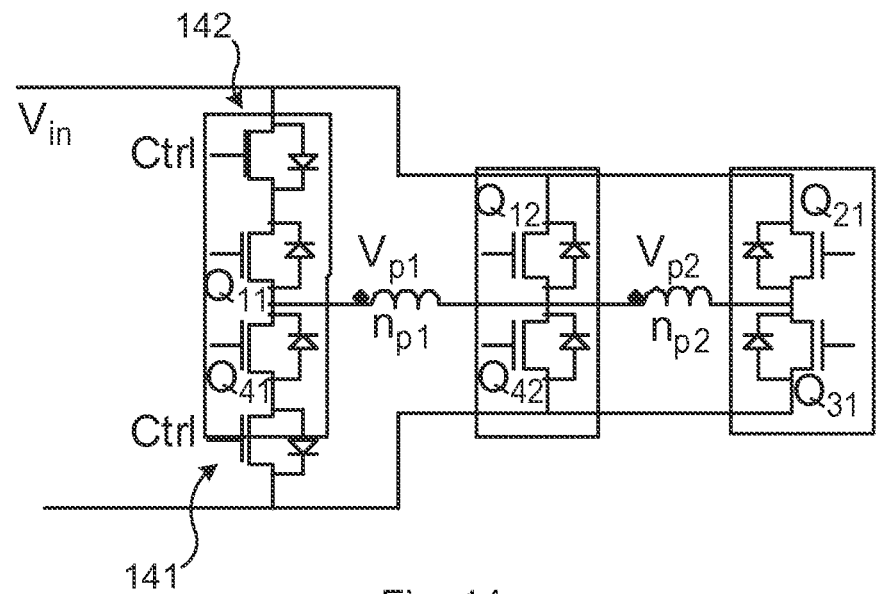
FIG. 14 illustrates, schematically, in a circuit diagram, an alternative embodiment of a converter, which can be used in the switched mode power supply of FIG. 1.

FIG. 14 illustrates, schematically, in a circuit diagram, an alternative embodiment of a converter, which can be used in the switched mode power supply of FIG. 1, wherein two switches in at least one of the legs comprise each two MOSFET transistors having their drains or sources connected together.

When implementing the primary side switches with switching elements as embedded body diodes, e.g. MOSFET's, these body diodes sometimes become forward biased, which ends their functionality. A solution is to use two MOSFET's $Q_{11}$, 142, $Q_{41}$, 141 connected in series with either the drains or the sources coupled together, as shown in FIG. 14. The series coupled solution is only required in the outer legs of the primary side of the converter. The order of the series connected MOSFET's $Q_{11}$, 142, $Q_{41}$, 141 is not important, hence, four different combinations are possible. The signal Ctrl to the MOSFET's 141, 142 can be selected in a plurality of manners. In one version, the Ctrl signal to MOSFET 141 is identical to the signal to the MOSFET $Q_{41}$, and the Ctrl signal to MOSFET 142 is identical to the signal to the MOSFET $Q_{11}$.

Figure 15:
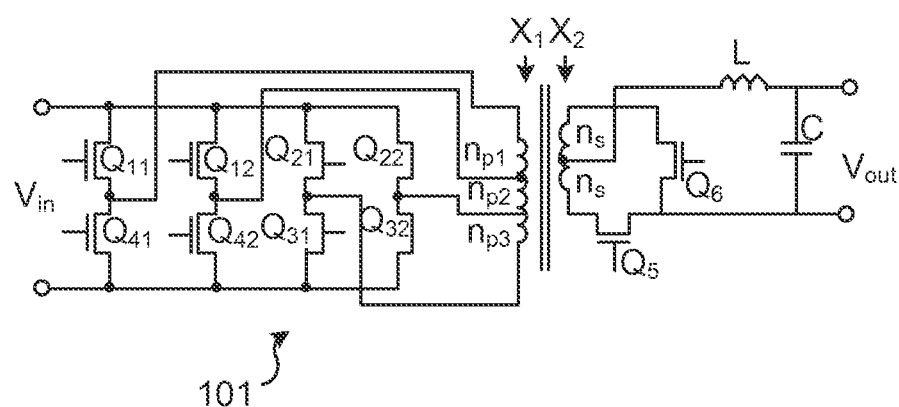
FIG. 15 illustrates, schematically, in a circuit diagram, a further alternative embodiment of a converter, which can be used in the switched mode power supply of FIG. 1.

FIG. 15 illustrates, schematically, in a circuit diagram, an alternative embodiment of a converter, which can be used in the switched mode power supply of FIG. 1.

The primary winding X1 comprises a first winding portion $n_{p1}$, a second winding portion $n_{p2}$, and a third winding portion $n_{p3}$, and the switch based circuitry comprises controllable switches $Q_{11}$, $Q_{41}$, $Q_{12}$, $Q_{42}$, $Q_{21}$, $Q_{31}$, $Q_{22}$, $Q_{32}$ of switching between a first operation state wherein the input voltage $V_{in}$ is connected only over the first winding portion $n_{p1}$, a second operation state wherein the input voltage $V_{in}$ is connected only over the first $n_{p1}$ and second $n_{p2}$ winding portions, and a third operation state wherein the input voltage $V_{in}$ is connected over the first $n_{p1}$, second $n_{p2}$, and third $n_{p3}$ winding portions, thereby enabling switching between three different transformer ratios.

The controllable switches $Q_{11}$, $Q_{41}$, $Q_{12}$, $Q_{42}$, $Q_{21}$, $Q_{31}$, $Q_{22}$, $Q_{32}$ arranged in four legs with two switches in each of the four legs, wherein each of the legs is connected in parallel with the input voltage $V_{in}$, and a point between the switches $Q_{41}$ of a first one of the legs is connected to one end of the primary winding $X_1$, a point between the switches $Q_{21}$, $Q_{31}$ of a second one of the legs is connected to the opposite end of the primary winding $X_1$, a point between the switches $Q_{12}$, $Q_{42}$ of a third one of the legs is connected to a point of the primary winding $X_1$ separating the first $n_{p1}$ and second $n_{p2}$ winding portions, and a point between the switches $Q_{22}$, $Q_{32}$ of a fourth one of the legs is connected to a point of the primary winding $X_1$ separating the second $n_{p2}$ and third $n_{p3}$ winding portions.

It shall further be appreciated that the concept of switching in and out primary winding portions in response to the output voltage can be applied to a great variety of SMPS topologies beside the full-bridge center-tapped secondary side transformer with synchronous rectification as disclosed above. Such topologies include, but are not limited to, half bridge and push-pull based circuitry on the primary side, and single winding and diode rectification circuitry on the secondary side. The concept can be used in any combination of primary side circuit, secondary side circuit, and type of rectification.

The control may be implemented using either analog or digital electronics, or a combination thereof.

The signal processing may be implemented in dedicated hardware, in software which are run e.g. on a microcontroller, or in a mix thereof.

Figure 16:
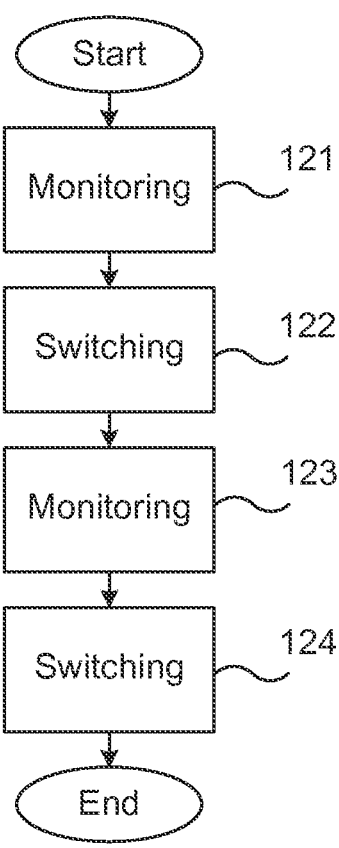
FIG. 16 is a schematic flow scheme of an embodiment of a method of operating a converter such as e.g. the converter of FIG. 3.

FIG. 16 is a schematic flow scheme of an embodiment a method of operating a converter such as e.g. the converter of FIG. 3. According to the method, the output voltage $V_{out}$ is, in a step, monitored, the controllable switches $Q_{11}$, $Q_{41}$, $Q_{12}$, $Q_{42}$, $Q_{21}$, $Q_{31}$ are, in a step, switched, thereby controlling the duty cycle in response to the monitored output voltage $V_{out}$ and a reference voltage using PID feedback control, the input voltage $V_{in}$ is monitored, and the controllable switches $Q_{11}$, $Q_{41}$, $Q_{12}$, $Q_{42}$, $Q_{21}$, $Q_{31}$ are switched between the first and the at least second operation states in response to the monitored output voltage $V_{out}$. That is, PID feedback control is used to fine tune the output voltage $V_{out}$ and the switching between operation states is used to be capable of obtaining a constant output voltage $V_{out}$ over a wider voltage range.

The embodiment of FIG. 16 may be modified to comprise switching of the switches in accordance with any of the control schemes, methods, and/or steps as disclosed above.

It shall be appreciated by a person skilled in the art that the embodiments disclosed herein are merely example embodiments, and that any details and measures are purely given as examples.

The invention claimed is:

1. A switched mode power supply comprising:
a switched mode converter; and
a controller for controlling the switched mode converter, the switched mode converter being provided for converting an input voltage to an output voltage and including:
 on a primary side, a primary winding and a controllable switch based circuitry connecting the input voltage over the primary winding; and
 on a secondary side, a secondary winding coupled to the primary winding, and a capacitive element connected over the secondary winding, wherein the output voltage is obtained as the voltage over the capacitive element,
wherein the primary winding comprises a first winding portion and at least one further winding portion, and
wherein the switch based circuitry comprises controllable switches capable of:
 switching to thereby control the duty cycle of the switched mode converter, and
 switching between a first operation state wherein the input voltage is connected only over the first winding portion and at least a second operation state wherein the input voltage is connected over the first and the at least one further winding portions, thereby enabling switching between two different transformer ratios,
the controller including:
 a first control arrangement connected to monitor the output voltage of the switched mode converter and operatively connected to the controllable switches to control the controllable switches to switch to thereby control the duty cycle in response to the monitored output voltage and a reference voltage using PID feedback control; and
 a second control arrangement connected to monitor the input voltage of the switched mode converter and operatively connected to the controllable switches to control the controllable switches to switch between the first and the at least second operation states in response to the monitored input voltage;
 wherein the PID feedback control comprises controlling the duty cycle in response to a proportional, an integral and a derivative term, each term being provided with a scaling factor; and, wherein the first control arrangement is configured to alter the scaling factor of the integral term of the PID feedback control simultaneously as the second control arrangement controls the controllable switches to switch between the first and the at least second operation states.

2. The switched mode power supply of claim 1, wherein the first and second control arrangements are configured to control the controllable switches via a driver arrangement.

3. The switched mode power supply of claim 1, wherein the second control arrangement is configured to control the controllable switches to switch from the first operation state to the second operation state when the monitored input voltage increases above a first threshold voltage and to switch from the second operation state back to the first operation state when the monitored input voltage decreases below the first threshold voltage.

4. The switched mode power supply of claim 1, wherein the second control arrangement is configured to control the controllable switches to switch from the first operation state to the second operation state when the monitored input voltage increases above a first threshold voltage and to switch from the second operation state back to the first operation state when the monitored output voltage decreases below a second threshold voltage, wherein the first threshold voltage is higher than the second threshold voltage.

5. The switched mode power supply of claim 1,
wherein the first control arrangement is configured to alter the scaling factor of the integral term of the PID feedback control to a first value when the second control arrangement controls the controllable switches to switch from the first operation state to the second operation state and to a second value when the second control arrangement controls the controllable switches to switch from the second operation state back to the first operation state; and,
wherein the first and second values are constants calculated from the transformer ratio of the first and second operation states and the monitored input voltages when the second control arrangement controls the controllable switches to switch between the first and second operation states.

6. The switched mode power supply of claim 1, wherein the first control arrangement is configured to repeatedly alter the scaling factor of the integral term of the PID feedback to a value, which is each time calculated from the transformer ratios of the first and second operation states and the current duty cycle.

7. The switched mode power supply of claim 1, wherein the second control arrangement is connected to monitor the output voltage of the switched mode converter, wherein:
when the monitored input voltage is below a first threshold voltage, the first control arrangement is configured to control the controllable switches to switch to thereby control the duty cycle in response to the monitored output voltage and a reference voltage using PID feedback control, while the second control arrangement is configured to keep the switched mode converter in the first operation state;
when the monitored input voltage is above the first threshold voltage but below a second threshold voltage, which is higher than the first threshold voltage, the second control arrangement is configured to control the controllable switches to switch between the first and the second operation states in response to the monitored output voltage, while the first control arrangement is configured to keep the duty cycle constant; and,
when the monitored input voltage is above the second threshold voltage, the first control arrangement is configured to control the controllable switches to switch to thereby control the duty cycle in response to the monitored output voltage and a reference voltage using PID feedback control, while the second control arrangement is configured to keep the switched mode converter in the second operation state.

8. The switched mode power supply of claim 1, wherein the controllable switch based circuitry is any of a full bridge, half bridge, or push-pull based circuitry.

9. The switched mode power supply of claim 1, wherein the controllable switches comprise six switches in three legs with two switches in each of the three legs, wherein each of the legs is connected in parallel with the input voltage, and a point between the switches of a first one of the legs is connected to one end of the primary winding, a point between the switches of a second one of the legs is connected to the opposite end of the primary winding, and a point between the switches of a third one of the legs is connected to a point the primary winding separating the first winding portion and the at least one further winding portion.

10. The switched mode power supply of claim 1, wherein:
the primary winding comprises a first winding portion, a second winding portion, and a third winding portion; and,
the switch based circuitry comprises controllable switches capable of switching between a first operation state wherein the input voltage is connected only over the first winding portion, a second operation state wherein the input voltage is connected only over the first and second winding portions, and a third operation state wherein the input voltage is connected over the first, second, and third winding portions, thereby enabling switching between three different transformer ratios.

11. The switched mode power supply of claim 10, wherein the controllable switches comprises eight switches in four legs with two switches in each of the four legs, wherein each of the legs is connected in parallel with the input voltage, and a point between the switches of a first one of the legs is connected to one end of the primary winding, a point between the switches of a second one of the legs is connected to the opposite end of the primary winding, a point between the switches of a third one of the legs is connected to a point of the primary winding separating the first and second winding portions, and a point between the switches of a fourth one of the legs is connected to a point of the primary winding separating the second and third winding portions.

12. The switched mode power supply of claim 9, wherein the two switches in at least one of the legs comprise each two MOSFET transistors having their drains or sources connected together.

13. The switched mode power supply of claim 10, wherein the controller is configured to control the controllable switches to switch between a connected state wherein the primary winding is connected to the input voltage and a disconnected state wherein the input voltage is disconnected from the primary winding such that the current direction through the primary winding is altered every time the primary winding is connected to the input voltage.

14. The switched mode power supply of claim 1, wherein the switched mode converter is a DC-DC converter.

15. The switched mode power supply of claim 1, wherein the switched mode converter is configured to operate with input and output voltages in the range of 10-100 V.

16. A base station comprising the switched mode power supply of claim 1.

17. A method of operating a switched mode converter provided for converting an input voltage to an output voltage and including, on a primary side, a primary winding and a controllable switch based circuitry connecting the input voltage over the primary winding and, on a secondary side, a secondary winding coupled to the primary winding and a capacitive element connected over the secondary winding, wherein the output voltage is obtained as the voltage over the capacitive element, wherein the primary winding comprises a first winding portion and at least one further winding portion and the switch based circuitry comprises controllable switches capable of switching to thereby control the duty cycle of the switched mode converter and capable of switching between a first operation state wherein the input voltage is connected only over the first winding portion and at least a second operation state wherein the input voltage is connected over the first and the at least one further winding portions, thereby enabling switching between two different transformer ratios, the method comprising:
- monitoring the output voltage;
- switching the controllable switches thereby controlling the duty cycle in response to the monitored output voltage and a reference voltage using PID feedback control;
- monitoring the input voltage; and,
- switching the controllable switches between the first and the at least second operation states in response to the monitored output voltage;
  - wherein the duty cycle is controlled in response to a proportional, an integral and a derivative term of the PID feedback control, each term being provided with a scaling factor, wherein the scaling factor of the integral term of the PID feedback control is changed simultaneously as the controllable switches are switched between the first and the at least second operation states.

18. The method of claim 17, wherein the controllable switches are switched from the first operation state to the second operation state when the monitored input voltage increases above a first threshold voltage and are switch from the second operation state back to the first operation state when the monitored input voltage decreases below the first threshold voltage or below a second threshold voltage, wherein the first threshold voltage is higher than the second threshold voltage.

19. The method of claim 17, wherein the scaling factor of the integral term of the PID feedback control is changed to a first value when the controllable switches are switched from the first operation state to the second operation state and to a second value when the controllable switches are switched from the second operation state back to the first operation state; and,
- wherein the first and second values are constants calculated from the transformer ratio of the first and second operation states and the monitored input voltages when the second control arrangement controls the controllable switches to switch between the first and second operation states.

20. The method of claim 17, wherein the scaling factor of the integral term of the PID feedback is repeatedly changed to a value, which is each time calculated from the transformer ratios of the first and second operation states and the current duty cycle.

21. The method of claim 17, wherein the second control arrangement is connected to monitor the output voltage of the switched mode converter, the method further comprising:
- when the monitored input voltage is below a first threshold voltage, controlling the controllable switches to switch to thereby control the duty cycle in response to the monitored output voltage and a reference voltage using PID feedback control, while the switched mode converter is kept in the first operation state;
- when the monitored input voltage is above the first threshold voltage but below a second threshold voltage, which is higher than the first threshold voltage, controlling the controllable switches to switch between the first and the second operation states in response to the monitored output voltage, while the duty cycle is kept constant; and,
- when the monitored input voltage is above the second threshold voltage, controlling the controllable switches to switch to thereby control the duty cycle in response to the monitored output voltage and a reference voltage using PID feedback control, while the switched mode converter is kept in the second operation state.

* * * * *